# United States Patent Office 3,279,218
Patented Oct. 18, 1966

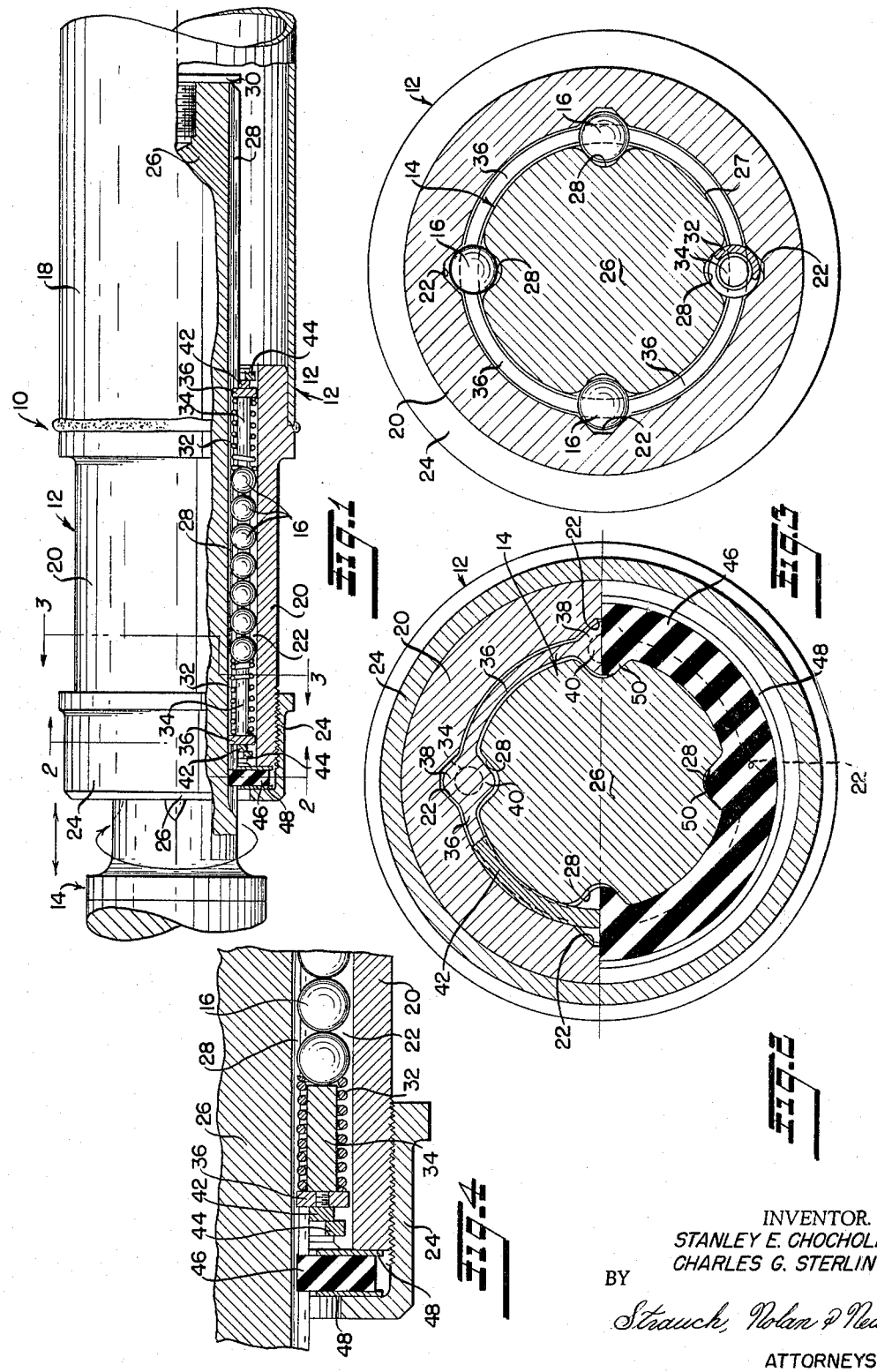

3,279,218
EXTENSIBLE DRIVE CONNECTIONS
Stanley E. Chocholek, Madison Heights, and Charles G. Sterling, Birmingham, Mich., assignors, by mesne assignments, to Rockwell-Standard Corporation, a corporation of Delaware
Filed May 11, 1964, Ser. No. 366,251
3 Claims. (Cl. 64—23)

This invention relates to extensible drive connections and more particularly to telescoping joints particularly adapted for use in vehicle drive or propeller shafts.

In normal operation of the vehicle the length of the propeller shaft varies constantly. Many prior proposals have been made to provide the required telescoping joints but none has been wholly satisfactory. For example, a spline connection, when acting under a heavy torsional load, develops excessive friction along the lateral edges of the splines which in turn reduces the ability of the propeller shaft to extend or contract except under axial forces which unduly load the universal joints provided at the opposite ends of the propeller shaft.

It has also been proposed to provide ball slip joints in which inner and outer telescoping propeller shaft members are grooved to receive series of balls which perform the dual function of transmitting torsional loads between the telescoping members and accommodating the required change in length of the propeller shaft. It is essential that the balls roll as the propeller shaft is lengthened or shortened since sliding action leads to rapid deterioration of the balls or the grooves in which they are received and involves a friction load approximately as high as that developed in the conventional splined joint.

It has been found in practice that normal vibration and shock loads applied to the propeller shaft, which is usually inclined, are sufficient to cause the balls to leave their normal centered position and progress toward the lower end of the grooves in which they are received. When this condition obtains, the balls are no longer free to roll with the disadvantages referred to above.

In an attempt to overcome this problem it has been proposed to position the balls in cages of various types. However, such expedients did not solve the problem and in many designs the construction was such that the cages were crushed under the high loads developed in operation.

In order to prevent this type of damage it was proposed to incorporate a pair of coil springs in the slip joint—one at each end of the rows of balls—to hold the balls substantially centered as disclosed in co-pending application Ser. No. 268,981, filed Mar. 29, 1963 now Patent No. 3,203,-202.

In heavy duty applications employing ball type slip joints of the type disclosed in the aforementioned co-pending application it became evident that the coil springs which extend around the inner shaft members were not sufficiently strong under some circumstances to keep the balls from being displaced towards one or the other end of the joint. This was due mainly to the large diameter of the coil springs in relation to their length and to the relatively small circumferential space between the inner and outer co-axial shaft members which limits the diameter of the spring wire. Although the spring arrangement in the aforementioned co-pending application is sufficient for light and medium duty application, in the heavy duty field the diameter of the coil springs would be such as to be considerably larger than the length of the spring thus producing a relatively weak spring not suitable for the intended purpose.

The present invention overcomes the above disadvantage by providing a number of individual coil springs placed directly in the ball grooves at both ends of the rows of balls. There are two oppositely acting coil springs provided for each row of balls which—although relatively small—exert a combined force considerably larger than can be obtained from the single large coil springs in the aforementioned co-pending application. By varying the number of coils and gauge thickness of the spring wire a variety of requirements can be fulfilled without change in the shaft members or ball arrangement.

With these considerations in mind it is a primary purpose and object of the present invention to provide improved ball type extensible drive connections affording improved performance and longer life particularly in heavy duty service.

It is a further object of the invention to provide improved ball type extensible drive connections including novel means for maintaining the balls in rolling contact with the telescoping drive members under normal operation conditions.

Another object of the present invention is to provide in an improved ball type extensible drive connection, resilient means associated with the balls in a novel manner to normally hold the balls in centered position and resiliently urge the balls away from their respective end abutments.

Still another object is to provide spacer rings in an improved ball type extensible drive connection between the inner and outer slideable shaft members to keep the members properly spaced and axially aligned at all times.

Additional objects and advantages of the present invention will become apparent as the description proceeds in connection with the accompanying drawings in which:

FIGURE 1 is a longitudinal half section of a drive shaft assembly embodying the novel slip joint of the present invention;

FIGURE 2 is a section through the drive shaft assembly along line 2—2 of FIGURE 1;

FIGURE 3 is another section through the ball portion of the drive shaft assembly along line 3—3 of FIGURE 1; and FIGURE 4 is an enlarged fragmentary view of the extensible drive connection of FIGURE 1 in section showing the shafts fully extended with the balls displaced towards one of the stop members.

With reference to the drawings, the extensible drive connection assembly 10 includes a tubular outer shaft member 12 and an associated solid inner shaft member 14 coaxially inserted within tubular shaft member 12. Shaft members 12 and 14 may be transmission or axle drive shafts as used in automotive vehicles to transmit driving force to a variety of drive mechanisms in a manner known in the art. Shaft members 12 and 14 are drivingly connected by groups of balls 16 placed within axially extending groove spaces between the shaft members. At the same time the balls 16 permit shaft members 12 and 14 to slide axially relative to each other to compensate for varying changes in the distance between the drive mechanisms inherent in the operation of automotive vehicles.

The tubular outer shaft member 12 comprises a tubular sheet metal section 18 welded to a section 20 of increased wall thickness at the ball joint assembly. Section 20 is provided with a number (in this instance 4) of equally spaced internal axial grooves 22 which provide the outer races for the rows of balls 16. The end of section 20 of tubular shaft member 12 is threaded to receive a cap 24 providing an outer closure member for the slip joint.

The inner shaft member 14 has a reduced portion 26 which extends through the closure cap 24 into the tubular shaft member 12 in co-axial relationship. Portion 26 is provided with a number of equally spaced external axial grooves 28 corresponding to the number of internal grooves 22. The grooves 28 extend to the end of the shaft where they are closed by a removable plate 30 screwed or otherwise secured to the face of the shaft end. Plate 30 limits the maximum extension of the shafts in one direction (which, however, under normal operation conditions will not be required) and also prevents any accidental complete separation of the shaft members during handling and shipping.

The grooves 28 are radially aligned with grooves 22 to provide an inner race for the balls 16 which thus are retained in axial rolling engagement within grooves 22 and 28. As shown in FIGURE 3 the radial distance between the inner shaft member 14 and outer shaft member 12 is considerably less than the diameter of the balls 16 thus establishing a positive drive connection between the shaft members.

Each group of balls 16 is normally suspended centrally of the slip joint by a pair of oppositely acting coil springs 32 placed within each of the grooves 22, 28 at each end of the rows of balls 16. The coil springs 32 are of the same or slightly less diameter as the balls 16 to reduce friction when the shafts slide relative to each other or when the coils of the springs contract or expand.

The springs 32 are positioned and retained on relatively long pins 34 attached to or integral with identical rings 36 extending around the inner shaft portion 26 within the radial space between the portions 20 and 26 of the shaft members. The thickness of the rings 36 is less than the dimension of the radial space between the shaft members to reduce the friction between the rings and the shaft members. The rings 36 are provided with a number of external and internal protrusions 38 and 40, respectively, which extend into the grooves 22 and 28, respectively, thus preventing the rings from rotating relative to the shaft members 12 and 14.

Immediately adjacent the spring retainer rings 36 are positioned spacer rings 42 extending around the inner shaft portion 26 within the radial space between the portions 20 and 26 of the shaft members 12 and 14. The thickness of the spacer rings 42 corresponds substantially to the radial distance between the portions of shafts 12 and 14 in the regions between the grooves so as to substantially completely fill this space as illustrated in FIGURE 2. Thus the spacer rings 42 keep the shaft members 12 and 14 continuously axially centered and aligned independently of the balls 16. The manufacturing tolerances for the balls and grooves are normally higher and not consistent at all points, whereas the internal and external surfaces of rings 42 and the annular surfaces of the shaft members can be machined to close tolerances substantially consistent at all contact points. Furthermore, the balls 16 and their associated groove surfaces eventually will show some signs of wear appearing as pits and depressions in the contact surfaces which, however small they may be, may cause axial misalignment of the shaft members which accelerates wear and induces undue load on the slip joint causing early failure. The spacer rings 42 prevent this condition by keeping the shaft members axially aligned at all times thus prolonging the life of the slip joint. The surfaces of the spacer rings 42 may be lubricated or otherwise prepared in known fashion to reduce sliding friction when the slip joint expands or contracts.

The above described assembly is axially retained by identical lock rings 44 placed at opposite ends thereof and received in grooves in the outer shaft portion 20.

A flat annular sealing member 46 of rubber or like material sandwiched between metal plates 48 is positioned at the outer end of portion 20 of the outer shaft member 12 and compressed thereagainst by the closure cap 24. The inner diameter of the sealing member 46 corresponds to the outer diameter of the inner shaft portion 26. The member 46 is provided with internal protrusions 50 which extend into the corresponding grooves 28 thus effectively sealing the assembly against entrance of foreign matter and preventing the escape of lubricant.

The entire slip joint assembly which is confined between the inner lock ring 44 and the closure cap 24 moves longitudinally with the outer shaft member 12 when the shaft members slide axially relative to each other. During this sliding movement the rows of balls 16 are held substantially centrally in the assembly, that is, midway between the lock rings 44 by force of the springs 32 thus allowing the balls to roll at all times.

Under rare conditions the rows of balls may be forced to one side of the assembly. Such a condition is illustrated at FIGURE 4. In that instance, the four springs at one side of the assembly are almost completely compressed. However, due to the compression of the springs 32 together with the initial pre-load of the springs the magnitude of the springs is such as to prevent abutment of the first balls in the rows with the spring retainer pins 34. The forces acting on the balls in a direction opposite to their intended travel are of sufficient magnitude to keep the balls resiliently suspended and thus assure their rolling even under such adverse operating conditions as illustrated in FIGURE 4. This centering action is further enhanced by the fact that, when the balls 16 travel to one side of the assembly the spring load at the other end of the ball rows will be relieved thus magnifying the spring force acting in the opposite direction of travel.

It is not intended to limit the present invention to the particular outer shaft structure and cap and sealing arrangement shown in FIGURE 1 since a variety of other conventional structures perform the same function and may also be used.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An extensible shaft assembly comprising inner and outer shaft members adapted to move axially, one within the other, between predetermined limit positions, said shaft members having mating axially extending groove spaces, groups of balls received in each of said groove spaces in rolling contact with the surfaces thereof, a pair of ring members extending around said inner shaft member adjacent the opposite ends of said groove spaces, each of said ring members carrying pins extending into said groove spaces towards the center thereof, springs coiled around each of said pins and compressed between said ring member and the adjacent end of one of said groups of balls, said springs being effective to maintain said groups of balls axially centered in said groove spaces when said inner and outer shaft members occupy a center position between said limit positions and means independent of said ring members and said groups of balls for maintaining said inner and outer shaft members in concentric relation.

2. The combination according to claim 1 together with a resilient sealing member carried by said outer shaft member and peripherally sealingly engaging said inner shaft member.

3. The combination according to claim 1 wherein said last-mentioned means comprises annular spacers extending radially across the space between said shaft members adjacent the opposite ends of the groove spaces in said outer shaft member.

References Cited by the Examiner

UNITED STATES PATENTS

| | | | |
|---|---|---|---|
| 2,269,254 | 1/1942 | Cribb. | |
| 2,605,622 | 8/1952 | Anderson | 64—23 |
| 2,833,598 | 5/1958 | Sloyan | 308—6 |
| 2,932,180 | 4/1960 | Smith-Pert | 64—23.7 |
| 3,003,827 | 10/1961 | Hentschke | 308—6 |
| 3,186,189 | 6/1965 | Cull | 64—21 |

FRED C. MATTERN, Jr., *Primary Examiner.*

HALL C. COE, MILTON KAUFMAN, *Examiners.*